US012567297B2

(12) United States Patent
Christianson et al.

(10) Patent No.: US 12,567,297 B2
(45) Date of Patent: Mar. 3, 2026

(54) SECURITY TAG

(71) Applicant: Sekura Global IP LLP, Colchester (GB)

(72) Inventors: David Christianson, Charlotte, NC (US); Ben Perreau, Matthews, NC (US)

(73) Assignee: Sekura Global IP LLP, Colchester (GB)

( * ) Notice: Subject to any disclaimer, the term of this patent is extended or adjusted under 35 U.S.C. 154(b) by 0 days.

(21) Appl. No.: 18/540,041

(22) Filed: Dec. 14, 2023

(65) Prior Publication Data

US 2024/0203184 A1 Jun. 20, 2024

(30) Foreign Application Priority Data

Dec. 14, 2022 (GB) ..................................... 2218804

(51) Int. Cl.

*E05B 73/00* (2006.01)
*G07C 9/28* (2020.01)
(Continued)

(52) U.S. Cl.

CPC ............ *G07C 9/28* (2020.01); *E05B 73/0017* (2013.01); *G08B 13/1445* (2013.01); *G08B 13/2405* (2013.01); *G08B 13/2434* (2013.01)

(58) Field of Classification Search

CPC ...... Y02E 60/10; H04B 11/00; H01M 10/052; G08C 23/02; G08B 13/1445; G08B 13/1463; G08B 13/2434; G08B 13/149; G08B 13/1481; G08B 13/2417; G08B 13/1409; G08B 13/246; G08B 13/126; G08B 13/242; G08B 13/2448; G08B 13/2482; G08B 13/1418; G08B 13/2402; G08B 13/2408; G08B 13/2442; G08B 13/2485; G08B 13/1454; G08B 13/19645; G08B 13/19652; G08B 13/19658; G08B 13/19669; G08B 13/19697; G08B 13/248;
(Continued)

(56) References Cited

U.S. PATENT DOCUMENTS 3,781,861 A 12/1973 Adler et al.
2002/0196143 A1 12/2002 Matsuo
(Continued)

FOREIGN PATENT DOCUMENTS

NL 8002961 12/1981

OTHER PUBLICATIONS

UKIPO Search Report from a corresponding GB patent application (GB 2218804.9) bearing a mailing date of May 19, 2023.

*Primary Examiner* — Dionne Pendleton
(74) *Attorney, Agent, or Firm* — Brown & Brown IP Law PLLC

(57) ABSTRACT

A security tag for use in a retail environment comprises a main body housing circuitry, the circuitry comprising an oscillator module connected to a buzzer for producing an audible alarm and a switch, and an elongate lanyard extending from the main body and including a normally closed sense loop electrically connected to the circuitry. The switch comprises a transistor. The circuitry is configured such that if the lanyard is cut or otherwise damaged so as to create an open circuit in the sense loop the transistor switch triggers the oscillator module to emit the audible alarm.

13 Claims, 1 Drawing Sheet

(51) Int. Cl.
*G08B 13/14* (2006.01)
*G08B 13/24* (2006.01)

(58) Field of Classification Search
CPC .. G08B 25/008; G08B 13/2462; G08B 13/06; G08B 13/08; G08B 13/2411; G08B 13/2454; G08B 3/00; G08B 3/10; G07C 9/28; G01S 1/725; E05B 45/005; E05B 73/0005; E05B 73/0017; E05B 73/0082; E05B 73/0029; E05B 45/06; E05B 73/0023; E05B 73/0052; A01K 11/006; A01K 61/90; A47F 7/024; A47F 7/022; B65H 75/265; B65H 75/48; G07G 1/0045; G07G 1/0054; G06Q 10/087; G06Q 10/08; G06Q 10/0833; G06Q 30/06; H02J 50/10; H02J 7/0042; B65D 55/06; G06K 19/07345; G06K 19/07758; G09F 3/0352; H01R 13/6205; H01R 13/622; H01R 13/639
See application file for complete search history.

(56) References Cited

U.S. PATENT DOCUMENTS

| | | | | |
|---|---|---|---|---|
| 2010/0308998 | A1* | 12/2010 | Hesch, Jr. | E05B 73/0017<br>340/572.8 |
| 2011/0210030 | A1 | 9/2011 | Londo et al. | |
| 2016/0211924 | A1* | 7/2016 | Deng | G08C 23/02 |
| 2018/0197389 | A1* | 7/2018 | Grant | G08B 13/1445 |
| 2022/0130221 | A1* | 4/2022 | Miller | G08B 13/1454 |

* cited by examiner

SECURITY TAG

FIELD OF THE INVENTION

The present invention relates to the field of security tags for use in a retail environment. In particular the invention relates to security tags that may be attached to or engaged with a variety of different goods in a retail environment.

BACKGROUND TO THE INVENTION

One type of security tag is attached to an item in a retail store and is configured to trigger an alarm if the item, and therefore the security tag, is removed from an area without deactivating the security tag. Typically these security tags operate by receiving a signal from an EAS gate or other structure at an exit of a retail store. If the security tag is activated, the receiving of the signal will cause the security tag to emit a response signal which will trigger an alarm. If, however, the security tag has been deactivated, for example at a point-of-sale upon purchase of the item, the response signal will not be emitted and the alarm will not be triggered.

In some cases such a security tag may be applied directly to a part of an item, for example to an item of clothing or an accessory such as a bag. In other circumstances the security tag may be attached to the packaging of the item. Accordingly, the tag may have a different form depending on the type of item to which it is to be attached. A security tag for attachment to an item of clothing may include a pin that pierces a part of the fabric to attach the tag to the clothing. A security tag for attachment to a larger box may include one or more straps that pass around the box.

Another type of security tag or security assembly comprises a tether or elongate length of cord that is engaged with one or more items in a retail display and then attached to a part of the display. In this type of assembly the tether or cord may, for example, be looped through handles of a plurality of bags on a display rail. The tether or cord will typically be connected to an alarm system, such that if the tether or cord is cut or otherwise tampered with, an alarm will sound. This may prevent or deter a thief from removing the item from the display.

It will be appreciated, therefore, that a number of different security tags are typically utilised in a retail environment, the form of the tag depending on the type of item to which the tag is to be attached, and depending on the manner in which the item is to be protected, for example individually or connected to a display.

It is an object of the present invention to provide a security tag that may be engaged with an item in a retail environment in a number of different configurations to deter theft of that item.

SUMMARY OF THE INVENTION

A first aspect of the present invention provides a security tag for use in a retail environment, comprising:

a main body housing circuitry, the circuitry comprising an oscillator module connected to a buzzer for producing an audible alarm and a switch; and an elongate lanyard extending from the main body and including a normally closed sense loop electrically connected to the circuitry, wherein, the switch comprises a transistor, and the circuitry is configured such that if the lanyard is cut or otherwise damaged so as to create an open circuit in the sense loop said transistor switch triggers the oscillator module to emit the audible alarm.

In preferred embodiments the switch is a field effect transistor. Preferably the normally closed sense loop is electrically connected to a gate connection of the transistor, a source connection of the transistor is connected to ground and a drain connection of the transistor is connected to the oscillator module. In some embodiments the oscillator includes a transistor. The drain connection of the transistor switch may be electrically connected to an emitter connection of said oscillator transistor.

In preferred embodiments a first end of the lanyard is attached to the main body and a male plug is disposed at a second end of the lanyard. The main body may comprise a female socket for receiving the male plug.

Preferably the normally closed sense loop comprises a coaxial cable.

The circuitry is preferably powered by a 3V battery.

To minimise the cost of the security tag, in preferred embodiments the circuitry does not include a microprocessor.

The security tag may further comprise a light emitter electrically connected to the sense loop and configured to emit light when an open circuit is formed in the sense loop. In some embodiments the light emitter is an LED and the circuitry comprises a light emitter module configured to cause the LED to flash at a first predefined frequency when the sense loop is normally closed and at a second predefined frequency when an open circuit is formed in the sense loop.

In preferred embodiments the security tag further comprises an EAS sensor.

A second aspect of the present invention provides an assembly comprising an item and a security tag according to the first aspect of the present invention. The main body of the security tag comprises a female socket for receiving the male plug, the lanyard is looped around a part of the item and the male plug is engaged with the female socket to retain the male plug in the female socket.

A third aspect of the present invention provides an assembly comprising an item, a structure, and a security tag according to the first aspect of the invention. The lanyard is looped around a part of the item or passes through an aperture of the item, and an end of the lanyard is attached to the structure to secure the item and the security tag to the structure.

A fourth aspect of the present invention provides an assembly comprising a first item and a second item, a retainer, a first security tag according to the first aspect of the invention, and a second security tag according to the first aspect of the invention. The main body of each of the first and second security tags comprising a female socket for receiving the male plug. The lanyard of the first security tag is looped around a part of the first item or passes through an aperture of the first item and the male plug of the first security tag is engaged with the female socket of the second security tag. The lanyard of the second security tag is looped around a part of the second item or passes through an aperture of the second item and the male plug of the second security tag is engaged with the retainer.

In some embodiments the retainer is a part of the first security tag. In other embodiments the retainer is a part of a third security tag. In further embodiments the retainer is a part of a fixed structure.

Preferred and/or optional features of each aspect and embodiment described above may also be used, alone or in appropriate combination, in the other aspects and embodiments also.

BRIEF DESCRIPTION OF THE DRAWINGS

The invention will now be further described by way of example only and with reference to the accompanying drawings, in which like reference signs are used for like features, and in which.

DESCRIPTION OF THE PREFERRED EMBODIMENTS

Figure 1:
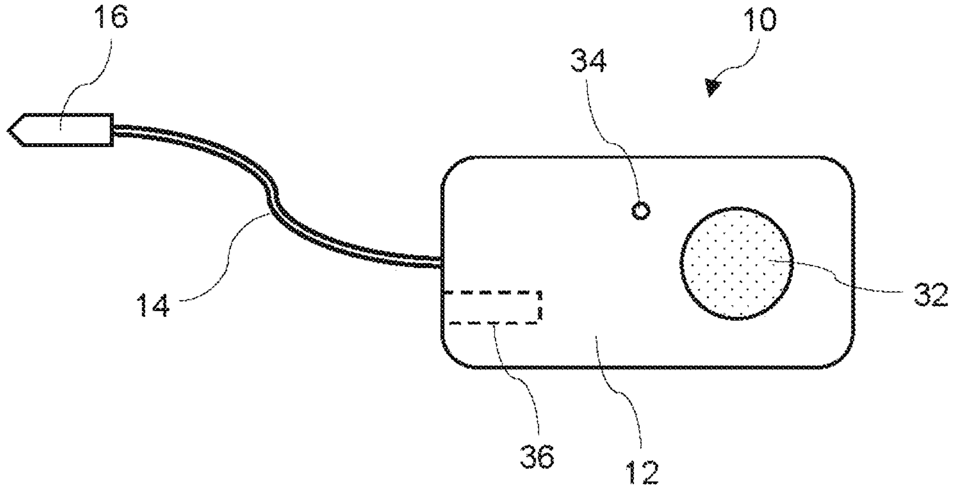
FIG. 1 illustrates a security tag according to an embodiment of the invention, including a main body and a tether.

A security tag 10 according to an embodiment of the present invention is shown in FIG. 1. The security tag 10 comprises a main body 12 and an elongate lanyard 14. The lanyard 14 is in the form of a flexible member (for example a cord or cable) that may be used to secure the security tag 10 to an object or item.

In this embodiment the lanyard 14 is connected at a first, proximal end to the main body 12. A male plug 16 is disposed at a second, distal end of the lanyard 14.

Figure 2:
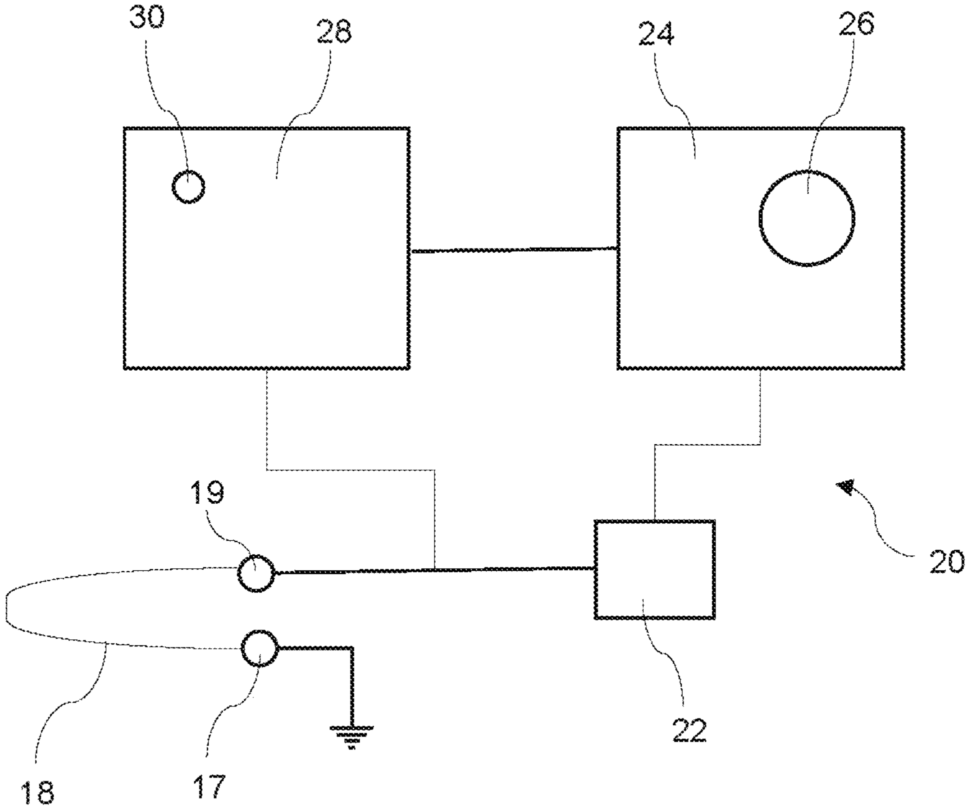
FIG. 2 is a schematic diagram of circuitry of the security tag of FIG. 1 housed in the main body.

Referring now to FIG. 2, a normally closed sense loop 18 is provided in the lanyard along the full length of the lanyard 14. The sense loop 18 provides electrical continuity (a path for current flow) along the length of the lanyard 14. The sense loop 18 may comprise a coaxial cable. The sense loop 18 is configured such that, if the lanyard 14 is cut at any point along its length this will produce an open circuit condition in the normally closed sense loop 18.

The sense loop 18 is electrically connected to circuitry 20 housed in the main body 12 of the security tag 10. A first electrical connection 17 of the sense loop 18 is preferably to ground. In this way, while the sense loop is normally closed, the voltage at a second electrical connection 19 of the sense loop 18 is also held at ground.

The circuitry 20 comprises a switch 22 and an oscillator module 24. The oscillator module 24 is electrically connected to a buzzer 26 for producing an audible alarm. The buzzer 26 is preferably a piezo buzzer.

The switch 22 comprises a transistor, which is preferably a voltage controlled field effect transistor (FET). Accordingly, the switch transistor has a gate connection or terminal, a source connection or terminal, and a drain connection or terminal. The switch 22 is disposed between the sense loop 18 and the oscillator module 24. Preferably, the second electrical connection 19 of the sense loop 18 is electrically connected to the gate terminal. The source terminal is preferably connected to ground, and the oscillator module 24 is preferably electrically connected to the drain terminal. In this way, when the sense loop 18 is normally closed the gate terminal is at ground and there is no flow of current between the source and drain terminals.

If the sense loop 18 is cut so that there is an open circuit in the sense loop 18, the voltage at the second electrical connection 19 rises. In this embodiment this results in the voltage at the gate terminal rising so that a current flows between the source and drain terminals and the voltage at the drain terminal drops to ground. This then switches on or activates the oscillator module 24, which in turn activates the buzzer 26 to generate an audible alarm. In preferred embodiments the switch 22 is a single FET.

In this embodiment the circuitry 20 further comprises a light emitter module 28 electrically connected to a light emitter 30. The light emitter 30 is preferably in the form of a light emitting diode (LED). In some embodiments the light emitter module 28 is electrically connected to the sense loop 18 such that, if the sense loop 18 is cut so that there is an open circuit in the sense loop 18, the light emitter 30 illuminates. In other, preferred embodiments, the light emitter module 28 is configured to cause the light emitter 30 to flash at a predefined frequency. The light emitter module 28 may be configured such that when the sense loop 18 is normally closed the light emitter 30 flashes at a first predefined frequency and when the sense loop 30 is cut so that it is open circuit the light emitter 30 flashes at a second predefined frequency. The second frequency is different to the first frequency, and preferably the second frequency is higher that the first frequency. The light emitter 30 or LED may provide a visual indication that the alarm has been triggered. The light emitter 30 or LED may also indicate when the circuit 20 is activated, i.e. when power is being supplied to the circuit 20, in addition to when the circuit is triggered to sound the buzzer 26.

The circuitry 20 is connected to and powered by a battery. In preferred embodiments the battery is a 3V battery.

It will be appreciated that, because the sense loop 18 is normally closed, as soon as the battery is connected to the circuitry 20, the circuitry 20 starts to drain power from the battery. In preferred embodiments the circuitry 20 does not include a microprocessor so that power drain by the circuitry 20 is minimal. Preferably none of the switch 22, oscillator module 24, or light emitter module 28 when present, include a microprocessor. The oscillator module 24, and light emitter module 28 when present, preferably include a transistor. The oscillator module 24, and light emitter module 28 when present, preferably only include one or more of resistor(s), transistor(s), capacitor(s), inductor(s) and diode(s).

The main body 12 of the security tag 10 preferably includes an array of apertures 32 in one wall of the main body 12. The buzzer 26 is disposed in the main body 12 proximate the array of apertures 32 so that when the buzzer 26 emits a sound, the sound is able to travel through the array of apertures 32. The main body 12 of the security tag 10 may also include a hole 34 through which the light emitter (LED) 30, if present, protrudes.

In some embodiments the main body 12 of the security tag 10 includes a female socket 36 for receiving the male plug 16. The female socket 36 may be disposed at any position on the main body 12. The female socket 36 may be disposed in a first wall of the main body 12 and the lanyard 14 may also extend from this first wall. In other embodiments the female socket 36 may be disposed in a second wall of the main body 12 opposite the first wall from which the lanyard 14 extends.

A locking mechanism is preferably disposed adjacent the socket 36 within the main body 12. The locking mechanism is configured to engage with the male plug 16 to retain the plug 16 within the main body 12. A release mechanism is provided to permit release of the locking mechanism and removal of the male plug 16 from the socket 36. The locking mechanism may comprise a clutch mechanism including a plurality of balls as is known in the art. The release mechanism may be a magnetic release mechanism so that a magnet placed in close proximity to the main body 12 releases the locking mechanism and allows withdrawal of the plug 16.

During use of the security tag 10, the male plug 16 of the tag 10 may be inserted into the female socket 36 of the same tag 10 so that the lanyard 14 forms a loop. In this way, the lanyard 14 may be looped around a part of an item to which the security tag 10 is to be attached, and with the male plug 16 engaged in the female socket 36 the security tag 10 is attached to the item.

It will be appreciated that because the sense loop 18 in the lanyard 14 is normally closed, it is not necessary to insert the male plug 16 of the lanyard 14 into a socket 36 in the same tag 10 to complete a circuit, as in prior art security tags. Accordingly, in an alternative arrangement, the male plug 16 of a first security tag 10 may be inserted into a female socket 36 of a second security tag 10 so that the first and second security tags 10 are joined or daisy chained together. This configuration may allow each lanyard 14 to be passed through a part of a different item in a retail display and then for the tags 10 to be joined together.

In a further arrangement the male plug 16 may be inserted into a socket in a part of the retail display or in any other suitable surface. This may allow the security tag 10 to be engaged with an item, and then for the item and security tag 10 to be secured to the retail display. If a person attempts to either remove the tag 10 from the item or detach the tag 10 from the retail display by cutting the lanyard 14, the alarm will sound to alert someone to the attempted unauthorised removal (theft) of the item.

The security tag 10 of the present invention preferably also includes an electronic article surveillance (EAS) sensor. The EAS sensor is configured to trigger an alarm if the security tag passes an EAS gate at an exit of the retail store, for example. The EAS sensor may be part of a separate EAS circuit in the security tag or the EAS sensor may be electrically connected to the oscillator module and/or the light emitter module. The EAS sensor may be electrically connected to the oscillator module so that the oscillator module is triggered to sound the buzzer either when the lanyard is cut or when the EAS sensor receives a signal from an EAS gate.

Other modifications and variations not explicitly disclosed above may also be contemplated without departing from the scope of the invention as defined in the appended claims.

The invention claimed is:

1. A security tag for use in a retail environment, comprising:

a main body housing circuitry, the circuitry comprising an oscillator module connected to a buzzer for producing an audible alarm and a switch; and an elongate lanyard extending from the main body and including a normally closed sense loop electrically connected to the circuitry, wherein, the switch comprises a transistor, and the circuitry is configured such that if the lanyard is cut or otherwise damaged so as to create an open circuit in the sense loop said transistor switch triggers the oscillator module to emit the audible alarm, wherein, a first end of the lanyard is attached to the main body, a male plug is disposed at a second end of the lanyard, and the main body comprises a female socket for receiving the male plug, and wherein it is not necessary for the male plug to be received in the female socket for the sense loop to be closed.

2. The security tag of claim 1, in which the switch is a field effect transistor and the normally closed sense loop is electrically connected to a gate connection of the transistor, a source connection of the transistor is connected to ground and a drain connection of the transistor is connected to the oscillator module.

3. The security tag of claim 2, in which the oscillator includes a transistor and the drain connection of the transistor switch is electrically connected to an emitter connection of said oscillator transistor.

4. The security tag of claim 1, in which the normally closed sense loop comprises a coaxial cable.

5. The security tag of claim 1, in which the circuitry is powered by a 3V battery.

6. The security tag of claim 1, in which the circuitry does not include a microprocessor.

7. The security tag of claim 1, further comprising a light emitter electrically connected to the sense loop and configured to emit light when an open circuit is formed in the sense loop.

8. The security tag of claim 7, in which the light emitter is an LED and the circuitry comprises a light emitter module configured to cause the LED to flash at a first predefined frequency when the sense loop is normally closed and at a second predefined frequency when an open circuit is formed in the sense loop.

9. The security tag of claim 1, further comprising an EAS sensor.

10. An assembly comprising:

an item; and the security tag of claim 1, the lanyard looped around a part of the item and the male plug engaged with the female socket to retain the male plug in the female socket.

11. An assembly comprising:

an item;

a structure; and the security tag of claim 1, the lanyard being looped around a part of the item or passing through an aperture of the item, and an end of the lanyard being attached to the structure to secure the item and the security tag to the structure.

12. An assembly comprising:

a first item and a second item;

a retainer;

a first security tag according to claim 1; and a second security tag according to claim 1, wherein, the lanyard of the first security tag is looped around a part of the first item or passes through an aperture of the first item and the male plug of the first security tag is engaged with the female socket of the second security tag, and the lanyard of the second security tag is looped around a part of the second item or passes through an aperture of the second item and the male plug of the second security tag is engaged with the retainer.

13. The assembly of claim 12, in which the retainer is a part of the first security tag, is a part of a third security tag, or is a part of a fixed structure.

* * * * *